United States Patent Office 3,129,282
Patented Apr. 14, 1964

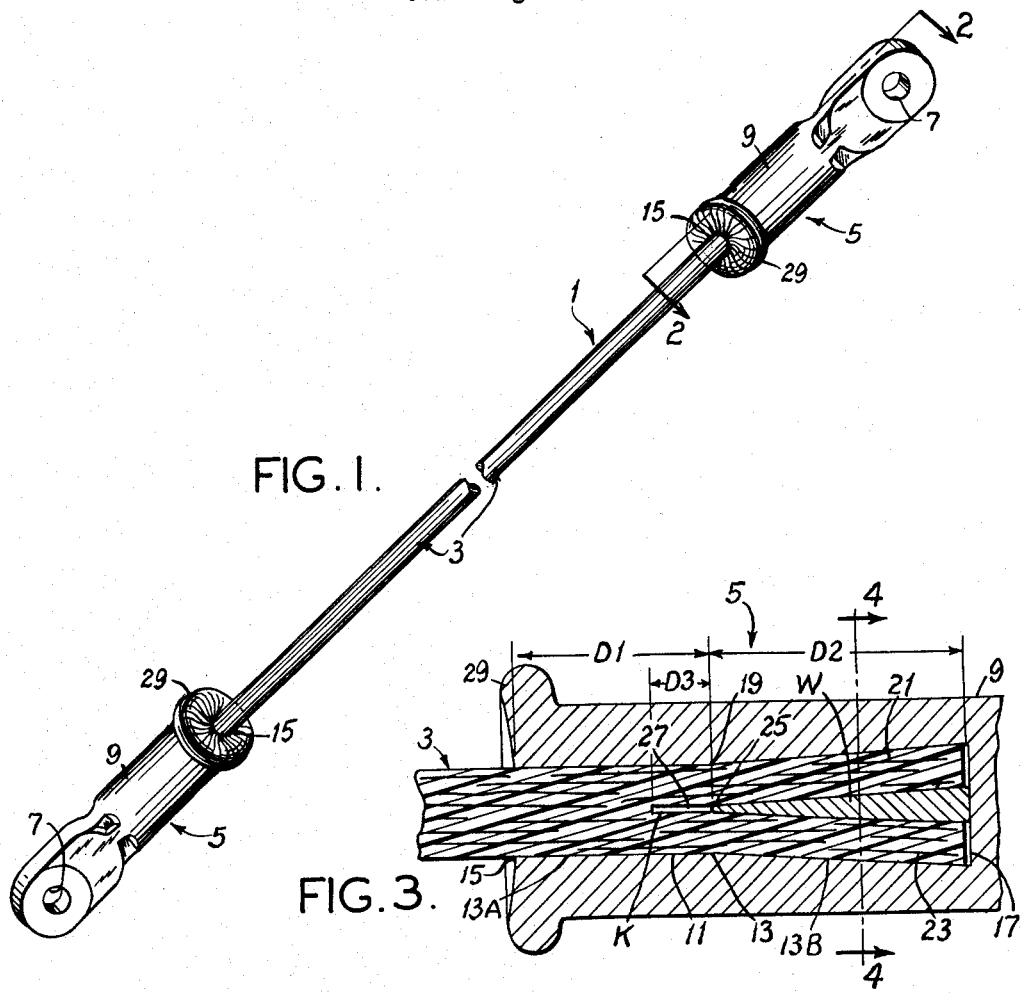
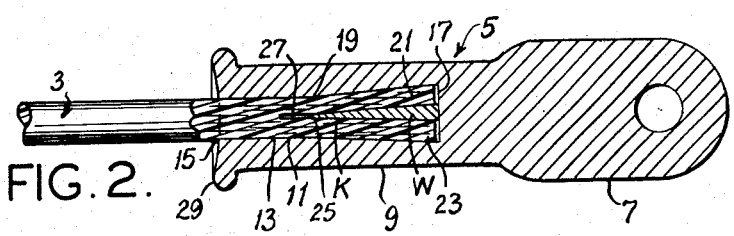
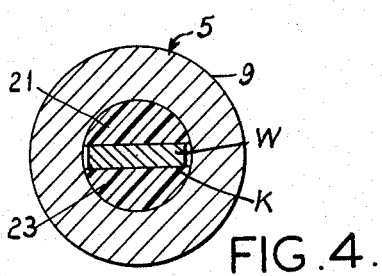

3,129,282
STRAIN INSULATORS
Gordon L. Flynn, Trussville, Ala., assignor to Anderson Electric Corporation, Leeds, Ala., a corporation of Alabama
Filed Aug. 23, 1962, Ser. No. 218,909
7 Claims. (Cl. 174—177)

This invention relates to insulators and more particularly to strain insulators for use in the electrical utility industry as, for example, insulator linkages in guy wires for high-voltage transmission line poles.

In the past few years there has been a distinct trend toward using resin-impregnated dielectric fiber rods with appropriate end attachment fittings in place of wood as the insulating member in strain insulators for guying utility poles. The dielectric rod material now in common use is fiber glass rod which is formed of longitudinally arranged glass fibers bonded together by suitable synthetic resins, such as polyesters, epoxy, melamine, phenolic, etc. Such rod has high dielectric strength, can withstand great stresses, has a very high strength-weight ratio, is dimensionally stable, has excellent weathering characteristics, is highly resistant to most chemicals, and is mildew- and rot-proof. There has been great difficulty, however, in securely anchoring the end portions of such fiber glass rods to end attachment fittings so that the strain insulator thus formed will retain its integrity under the high tensile forces it must withstand during use without splitting, weakening or axially creeping, etc. The most substantial problem involved in fabricating strain insulators of this type is that fiber glass rod is highly susceptible to splitting. Numerous approaches have been made in the past to anchoring the end of the fiber glass rods in the end fittings including using conical socket cavities and enlarging the rod end by forming an unreinforced cured resin body within the socket, as well as using wedges engaged in split rod ends. These prior systems have tended to be unsatisfactory under service conditions. For example, the nonreinforced resin material types tend to gradually flake away and cause failure, and the unrestrained wedge types tend to split the rod and also fail. In the latter systems, if the taper angles of the wedges were substantial enough to effect sufficient holding power uncontrollable splitting would occur, and if wedges with lesser taper angles were employed there would be insufficient holding power.

Accordingly, among the several objects of this invention may be noted the provision of strain insulators in which fiber glass rods are anchored to end attachment fittings with great holding power and without effecting fracturing or splitting of the rod; the provision of insulators of the class described which are physically rugged, have excellent electrical characteristics, are economical to produce and are dependable under all types of service conditions; the provision of such insulators that are sealed against water penetration and in which the fiber glass rod component is protected from damage by flashovers; and the provision of a simple, convenient and reliable method of fabricating such insulators. Other objects and features will be in part obvious and in part pointed out hereinafter.

The invention accordingly comprises the constructions and methods hereinafter described, the scope of the invention being indicated in the following claims.

In the accompanying drawings, in which one of various possible embodiments of the invention is illustrated, FIG. 1 is a perspective view of a strain insulator of the present invention;

FIG. 2 is a fragmentary longitudinal section taken on line 2—2 of FIG. 1;

FIG. 3 is an enlarged view of FIG. 2; and

FIG. 4 is a cross section taken on line 4—4 of FIG. 3.

Corresponding reference characters indicate corresponding parts throughout the several views of the drawings.

Referring to the drawings, an insulator of the present invention, designated in its entirety by reference character 1, is shown to comprise an elongate rod 3 of a resin-impregnated dielectric material, such as fiberglass or the like, and two end attachment members or fittings 5 secured to opposite ends thereof. Each of these exemplary type end fittings 5 includes an eye portion 7 to which may be secured the end of a guy wire, and a socket 9 for receiving and holding an end portion 11 of rod 3. Fittings 5 are preferably formed of a strong metal or metallic alloy such as cast aluminum. Each socket 9 has a conico-cylindrical cavity 13 with a cylindrical portion 13A extending inwardly into the socket from its mouth 15 for a distance as indicated by D1. Coaxial with cylindrical section 13A is a conical section 13B of the cavity which extends outwardly from seat 17 of the socket for a distance D2 and tapers toward cylindrical portion 13A. These two portions 13A and 13B intersect and join at 19, which junction is a circle which may be referred to as a taper take-off circle.

The end portion 11 of rod 3 is axially slotted or cut along its center line to provide a kerf K extending inwardly from the end of the rod along a longitudinal diametrical plane thereof for a distance somewhat greater than the length of conical portion 13B, i.e., D2, but less than the sum of D1 and D2. Engaged in kerf K is a wedge W, preferably of a metallic material such as aluminum, which separates and flares out portions 21 and 23 of rod end 11 on opposite sides of the kerf to form an enlarged rod end engaging the surfaces of conical portion 13B. Wedge W has a taper angle which is equal or preferably slightly greater than that of the conical portion 13B. That is, the included angles of conical portion 13B and wedge W are approximately equal and preferably the latter is somewhat greater. Although the wedge taper angle may vary considerably, it may, for example, be about 4–6°, in which event the taper of 13B must be not greater than 6° and should be somewhat less. The length of the wedge is less than that of the kerf and substantially equal to distance D2. Thus the entering end of the wedge as indicated at 25 is spaced from the inner end of the kerf to form an opening 27. The length of this opening is indicated at D3. The thickness of wedge W adjacent its entering end 25 is slightly greater than that of the kerf. As the diameter of rod 3 is substantially equal to that of cylindrical portion 13A, and as the wedge's entering end (exclusive of the usual wedge knife edge) thickness at the distance D2 from the socket seat is slightly greater than that of the kerf, the outer surfaces of rod end 11 at the taper take-off circle 19 are firmly pressed radially outward against the socket cavity at this circle of junction of 13A and 13B. The width of the wedge as indicated in FIG. 4 is preferably slightly less than the diameter of rod 3.

As will be described hereinafter, the surfaces of the conical and cylindrical cavity portions 13A and 13B, the wedge W, the rod end portion and the kerf are preferably coated with a synthetic resin material which bonds the contacting surfaces firmly together and forms an effective weather seal. Epoxy resins have been found to be excellent for this purpose and resins of this type are widely available which will not harden or become brittle with time and will not be adversely affected by long term vibration, shock and twisting.

It will be noted that the face portion or mouth 15 of the socket is concave and thereby provides a rim 29 on the socket end which is peripherally spaced away from the outer surfaces of the rod. This is an advantageous feature as frequently flashovers will occur between strain insulator end fittings. As the closest distance between the end fittings is between the rims 29 this flashover will not strike or terminate at a joint where the mouth and rod 3 join. This structural arrangement therefore protects the rod from flashovers by confining them to a path away from the rod surfaces.

In accordance with another aspect of this invention, the method of fabricating such insulators is disclosed. The end portion 11 of rod 3 is anchored in the conico-cylindrical cavity as follows: After the rod end is slotted or sawed to form kerf K, wedge W is lightly or initially engaged with its entering end introduced into the kerf at the rod end and the cavity, rod end portions, wedge and kerf are coated with a fluid uncured epoxy or other suitable synthetic resin. This coating can be conveniently and simply accomplished by partially filling the cavity 13 with the uncured resin. The rod-wedge assembly is then inserted into the socket with sufficient pressure to force said rod end and wedge base against socket seat 17. During this action the rod end portions or arms 21 and 23 separate and are spread outwardly toward the surfaces of conical portion 13B and form an enlarged end portion of the rod engaging the surfaces of the conical section. Thus the arms 21 and 23 flex or cantilever about the taper take-off circle 19, but any further outward movement of the rod end in this area is prevented. This action and the unoccupied (except for uncured resin material) opening 27 provide the important function of eliminating any splitting of the rod, or at the least will restrict any such tendency to a minute crack of very short length. Thus the rod arms 21 and 23 because of this arrangement are permitted advantageous flexing action and freedom, and as the wedge's entering edge is restrained from further movement toward the inner end of the kerf and these points are well back inside of the mouth of the fitting, there is no built-in stress tending to make the rod split. Tension is then applied between the end fittings 5 and rod 3 which more firmly sets the separated end portions and wedge relative to the conical cavity surfaces and the kerf, thereby forming a uniform seal between the mating or contacting surfaces thereof. The resin material is cured to form a permanent bond between the assembled components, either before or during tensioning.

It will be understood that the use of the bonding resin is not essential to the practice of this invention (although it is preferred as it does provide considerable advantages such as weather sealing), and that without it good anchoring can be effected between the rods end(s) and fitting(s) without any rod splitting.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An insulator comprising an elongate resin-impregnated dielectric fiber rod, an attachment member having a socket for receiving and holding an end portion of said rod, said socket comprising a conico-cylindrical cavity with a cylindrical portion extending inwardly into the socket from the mouth thereof for a first distance and a conical portion extending outwardly for a second distance from the seat of the socket and tapering toward the cylindrical portion, said end portion of said rod having a diameter substantially equal to that of said cylindrical portion, said end portion of said rod having a kerf extending inwardly from the end of the rod along a longitudinal diametrical plane of said rod and having a length greater than said second distance, and a wedge engaged in said kerf separating and flaring out the portions of the rod on opposite sides of the kerf thereby forming an enlarged end portion of the rod engaging the surfaces of said conical portion, said wedge having a taper angle not less than that of said conical portion and a length less than that of said kerf, the entering end of the wedge being spaced from the inner end of the kerf.

2. A strain insulator as set forth in claim 1 in which the cavity, wedge, kerf and rod end portions are coated with a synthetic resin.

3. A strain insulator as set forth in claim 1 in which the mouth of said socket is concave and thereby provides a rim on the socket end of the attachment member peripherally spaced away from the outer surfaces of the rod.

4. A strain insulator comprising an elongate fiber glass rod, an attachment member having a socket for receiving and holding an end portion of said rod, said socket comprising a conico-cyclindrical cavity with a cylindrical portion extending inwardly into the socket from the mouth thereof for a first distance and a conical portion extending outwardly for a second distance from the seat of the socket and tapering toward the cylindrical portion, said end portion of said rod having a diameter substantially equal to that of said cylindrical portion, said rod end portion having a kerf extending inwardly from the end of the rod along a longitudinal diametrical plane of said rod and having a length greater than said second distance but less than the sum of said first and second distances and a wedge engaged in said kerf separating and flaring out the portions of the rod on opposite sides of the kerf thereby forming an enlarged end portion of the rod engaging the surfaces of said conical portion, said wedge having a length substantially equal to said first distance and a thickness adjacent its entering end approximately equal to that of the kerf, said wedge having a taper angle not less than that of said conical portion, the entering end of the wedge being spaced from the inner end of the kerf.

5. A strain insulator as set forth in claim 4 in which the cavity, wedge, kerf and rod end portions are coated and firmly bonded together with an epoxy-resin.

6. A strain insulator as set forth in claim 5 in which the mouth of said socket is concave and thereby provides a rim on the socket end of the attachment member peripherally spaced away from the outer surfaces of the rod.

7. The method of anchoring a fiber glass rod to an attachment member having a socket with a conico-cylindrical cavity with a cylindrical portion extending inwardly into the socket from the mouth thereof for a first distance and a conical portion extending outwardly for a second distance from the seat of the socket and tapering toward the cylindrical portion, said method comprising:

slotting the end of said rod to provide a kerf extending inwardly from the end of the rod along a longitudinal diametrical plane of the rod for a length greater than said second distance, lightly engaging a wedge in the kerf at the rod end, said wedge having a length approximately equal to said second distance and a taper angle not less than that of said conical portion, coating the cavity, rod end portions, wedge and kerf with a fluid uncured synthetic resin, inserting the rod end and wedge assembly thus formed into said socket with sufficient pressure to force said rod end and wedge against said socket seat and to move the entering end of the wedge to a position spaced from the inner end of the kerf thereby separating and flaring out the rod end portions on opposite sides of the kerf to form an enlarged end portion of the rod engaging the surfaces of said conical portion, curing said resin to permanently bond the assembled components firmly together, and applying tensioning forces between said attachment member and said rod to more firmly set the separated rod end portions and wedge relative to said conical surfaces and said kerf and to form a uniform seal between the mating surfaces of the socket, rod end portions and wedge.

References Cited in the file of this patent

UNITED STATES PATENTS

| | | |
|---|---|---|
| 71,564 | Wood | Nov. 26, 1867 |
| 1,501,732 | Steinberger | July 15, 1924 |
| 1,815,598 | Stroup | July 21, 1931 |
| 1,942,133 | Burke | Jan. 2, 1934 |
| 2,825,752 | Knutz et al. | Mar. 4, 1958 |
| 2,874,937 | Higgins | Feb. 24, 1959 |

FOREIGN PATENTS

| | | |
|---|---|---|
| 620,243 | Canada | May 16, 1961 |
| 1,199,703 | France | June 22, 1959 |
| 1,214,715 | France | Nov. 9, 1959 |

OTHER REFERENCES

A. B. Chance Co. advertisement, "Guy-Strain Insulator," Electrical World, July 13, 1959, page 70.